United States Patent
Shaffer et al.

(10) Patent No.: US 6,526,041 B1
(45) Date of Patent: Feb. 25, 2003

(54) APPARATUS AND METHOD FOR MUSIC-ON-HOLD DELIVERY ON A COMMUNICATION SYSTEM

(75) Inventors: Shmuel Shaffer, Palo Alto, CA (US); Uwe Wrede, San Jose, CA (US); William Joseph Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/152,939

(22) Filed: Sep. 14, 1998

(51) Int. Cl.[7] .............................................. H04L 12/66
(52) U.S. Cl. ........................ 370/352; 379/393; 709/203
(58) Field of Search .................................. 370/389, 401, 370/428, 546, 352, 356; 379/215, 393, 258, 259, 260, 261, 262, 263, 264, 265, 266, 267, 268, 309; 709/203, 231; 348/14.01

(56) References Cited

U.S. PATENT DOCUMENTS

| | | | |
|---|---|---|---|
| 5,187,591 A | 2/1993 | Guy et al. | |
| 5,583,563 A | 12/1996 | Wanderscheid et al. | |
| 5,734,119 A | 3/1998 | France et al. | |
| 5,999,525 A | * 12/1999 | Krishnaswamy et al. | ... 370/352 |
| 6,009,176 A | * 12/1999 | Gennaro et al. | ............ 713/170 |

* cited by examiner

*Primary Examiner*—Melvin Marcelo
*Assistant Examiner*—Inder Palmehra

(57) ABSTRACT

A system for enabling music to be provided to callers placed on hold in a LAN network used for voice communications. Bandwidth consumption is minimized by ensuring that music-on-hold is provided in a manner that enables most necessary tasks to be executed by a client instead of a server. In specific embodiment, the music-on-hold system is configured to transfer a small application program or applet, having a music file and a media player, from the server to the client if necessary. Concurrently, a real time protocol (RTP) stream carrying music is used to provide music to the client from the server during the applet transfer to ensure that the held caller receives music at all times. The RTP stream is initially used to provide music to held callers.

19 Claims, 6 Drawing Sheets

APPARATUS AND METHOD FOR MUSIC-ON-HOLD DELIVERY ON A COMMUNICATION SYSTEM

BACKGROUND OF THE INVENTION

1. Field of the Invention

The present invention generally relates to a system that allows voice communications over a LAN network, and more particularly, to a voice communications over LAN network which includes a low bandwidth consuming music-on-hold system that enables music to be provided to callers placed on hold on the LAN.

2. Description of the Prior Art

Music-on-hold is a common feature that has been in use for many years in private branch exchanges (PBX) and automatic call distribution (ACD) systems. In such systems, typically, a B-channel is connected from the music source to the callers. This enables the callers to listen to music while on hold and waiting, for example, their turn in an ACD queue for the next available call center agent. Recently, however, packet-based communications networks are being used for telephony over local area network (ToL) systems, in other words, voice communications over LANs. In particular, a network user is able to pick up a telephone and complete a call to a destination user who may be connected either to the same network server within the network, or to a different server using the public switched telephone network. This is accomplished by converting voice received from the telephone handset into packet data, and sending the packets over the local area network (LAN) to the destination user. The packet data is then converted back into voice at the destination to enable the user to listen to the voice audio on a telephone handset.

In a conventional telephone system, if available connections or trunks to the ACD system run out, users may hear a busy signal and will not be able to establish a connection to the ACD. There is no degradation in performance for those existing callers who had been able to call into the ACD system and subsequently been put on hold. In contrast, in an internet protocol (IP) type system, an almost unlimited number of users may contact the ACD over a single internet pipe. As the number of callers increases, the pipe, or communications lines, becomes increasingly full and all the available bandwidth may be consumed. At that point, the network may crash or become unacceptably slow. In addition, the condition may be exacerbated in ToL systems because an excessive number of callers on hold may cause a network's available bandwidth to be flooded with packets of music. Thus, there is a need for a bandwidth preserving music-on-hold system for use with ToL.

SUMMARY OF THE INVENTION

Briefly, the present invention relates to a system that enables music to be provided to callers placed on hold in a LAN network used for voice communications. Bandwidth consumption is minimized by ensuring that music-on-hold is provided in a manner that enables most necessary tasks to be executed by a client instead of a server, thereby reducing traffic over the network communications lines. In a first embodiment of the invention, when a caller is placed on hold, the music-on-hold system is configured to transfer a small application program or applet, having a music file and a media player, from the server to the client. Concurrently, a real time protocol (RTP) stream carrying music is used to provide music-on-hold to the client from the server during the applet transfer. This ensures that the held caller receives music at all times. The RTP stream is used in the above manner to provide music to held callers in all embodiments of the invention. In another embodiment of the invention, the applet includes only the media player which is transferred from the server to the client. The music provided by the RTP stream is saved by the client as an audio file on a mass storage device for later playback by the media player. In another embodiment of the invention, the media player is built into the client and therefore eliminates the requirement for any files to be transferred from the server to the client. Again, the music provided by the RTP stream is saved by the client on a mass storage device for playback by the media player.

These and other advantages of the present invention will be readily understood with reference to the following specification and attached drawings.

DETAILED DESCRIPTION OF SPECIFIC EMBODIMENTS THE INVENTION

The present invention relates to a music-on-hold system that is adapted to be utilized in a ToL system. As will be discussed in more detail below, the music-on-hold system is adapted to be used within a LAN to enable preservation of bandwidth. For example, in instances where the load on the LAN is, or may become, excessive, other users may experience mild to severe performance degradation. In accordance with an important aspect of the invention, the music-on-hold system is able to dynamically determine the bandwidth requirements for providing music to the caller. This feature enables the music-on-hold system to use only the necessary amount of bandwidth to provide music to held callers, without causing the LAN connections to become saturated. In accordance with another important aspect of the invention, the music-on-hold system preserves server resources. For example, by enabling music files and media player files to be executed on a less busy client, resources may be preserved at the server. A client may include an end user/caller on the ToL system or software present on a gateway (FIG. 1).

The present invention is compatible with various ToL systems, such as those that comply with the H.323 standard (incorporated herein by reference) promulgated by the International Telecommunication Union (ITU) system, in addition to others. In addition, the present system may also be used for multimedia applications, such as video-on-hold. In general, it is to be understood that the present invention applies to any server-client system used for transmitting audio, video or multimedia, including internet connections. For example, audio messages may be delivered by an internet world wide web site to an end user wherein real time audio is sent as an RTP stream and other data is downloaded using remaining available bandwidth. A particular advantage of downloading the applet 54 (FIG. 2) to the end user is that the end user may choose to go backwards to replay parts of the music or message locally. Thus, network bandwidth is not impacted. Such a system is preferred in situations such as computer based training and other technical support delivery, wherein the user may want to retain the previously delivered information.

Figure 1:
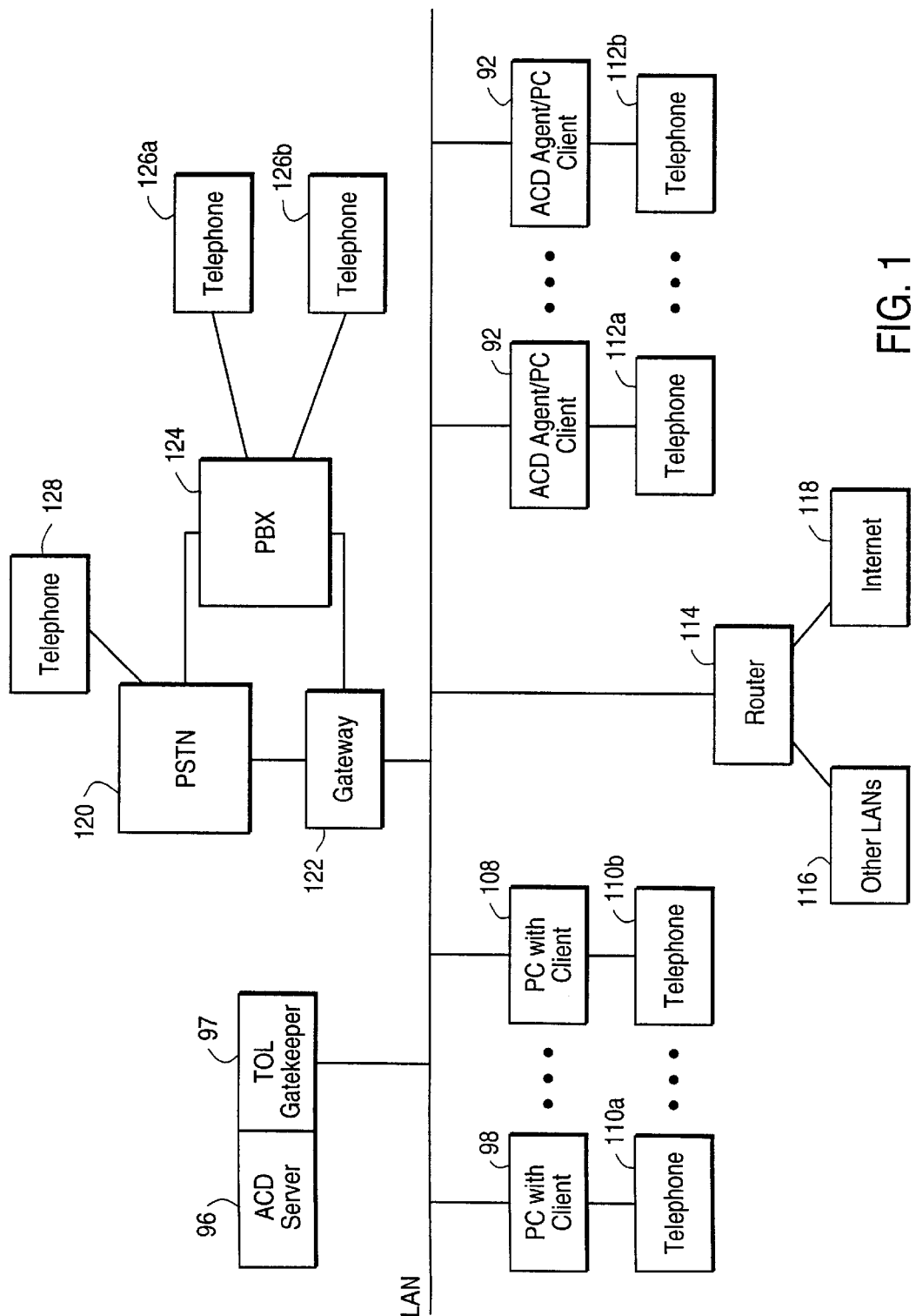
FIG. 1 is a diagram of the music-on-hold system in a communications network.

Referring to FIG. 1, an exemplary embodiment of the music-on-hold system in a ToL system in accordance with the present invention, is shown. In particular, a number of different devices may be connected to the LAN, including an ACD server 96 connected to a ToL gatekeeper 97. Other devices may include a gateway 122 for connecting to the public switched telephone network (PSTN) 120 and/or to a private branch exchange (PBX) 124 to which telephones 126a, 126b, 128 are connected to enable users to contact and ACD agent. Agents may be connected to the LAN by way of one or more ACD agent/personal computer (PC) clients 92. The agents communicate with callers using telephones 112a, 112b connected to the ACD agent/PC clients 92. A router 114 may also be connected to the LAN to enable the LAN to communicate with other LANs 116 and/or the Internet 118. Thus, it can be seen that calls may originate from the PSTN or PBX via the gateway, from within the ToL system itself, the ACD system and/or other LANs or the Internet. It is to be noted that although a variety of different devices, as discussed above, may be connected to the LAN, the present invention is described wherein a user communicates with ACD agents through the telephones 110a, 110b connected to PCs with clients 98, 108.

Figure 5:
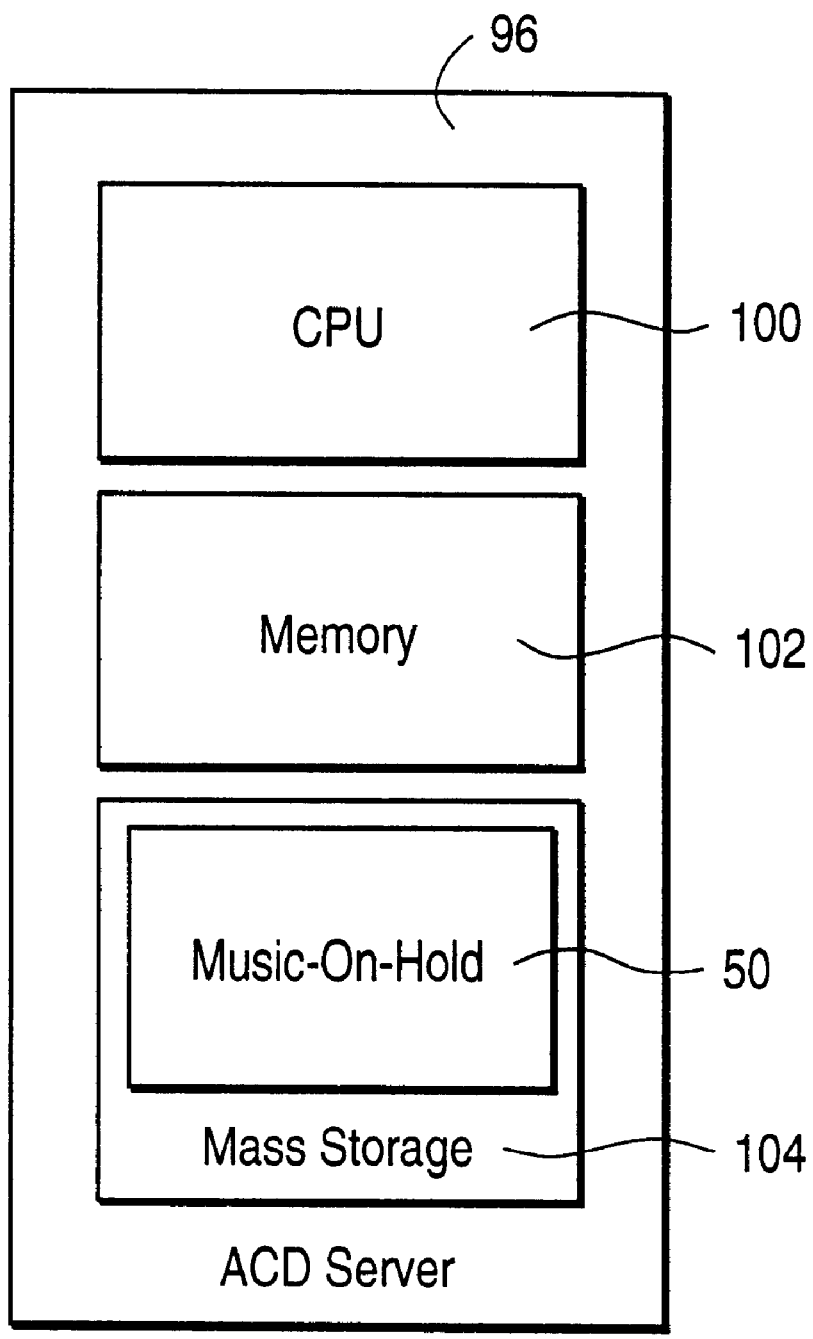
FIG. 5 is a detailed diagram of the automatic call distribution server.
Figure 6:
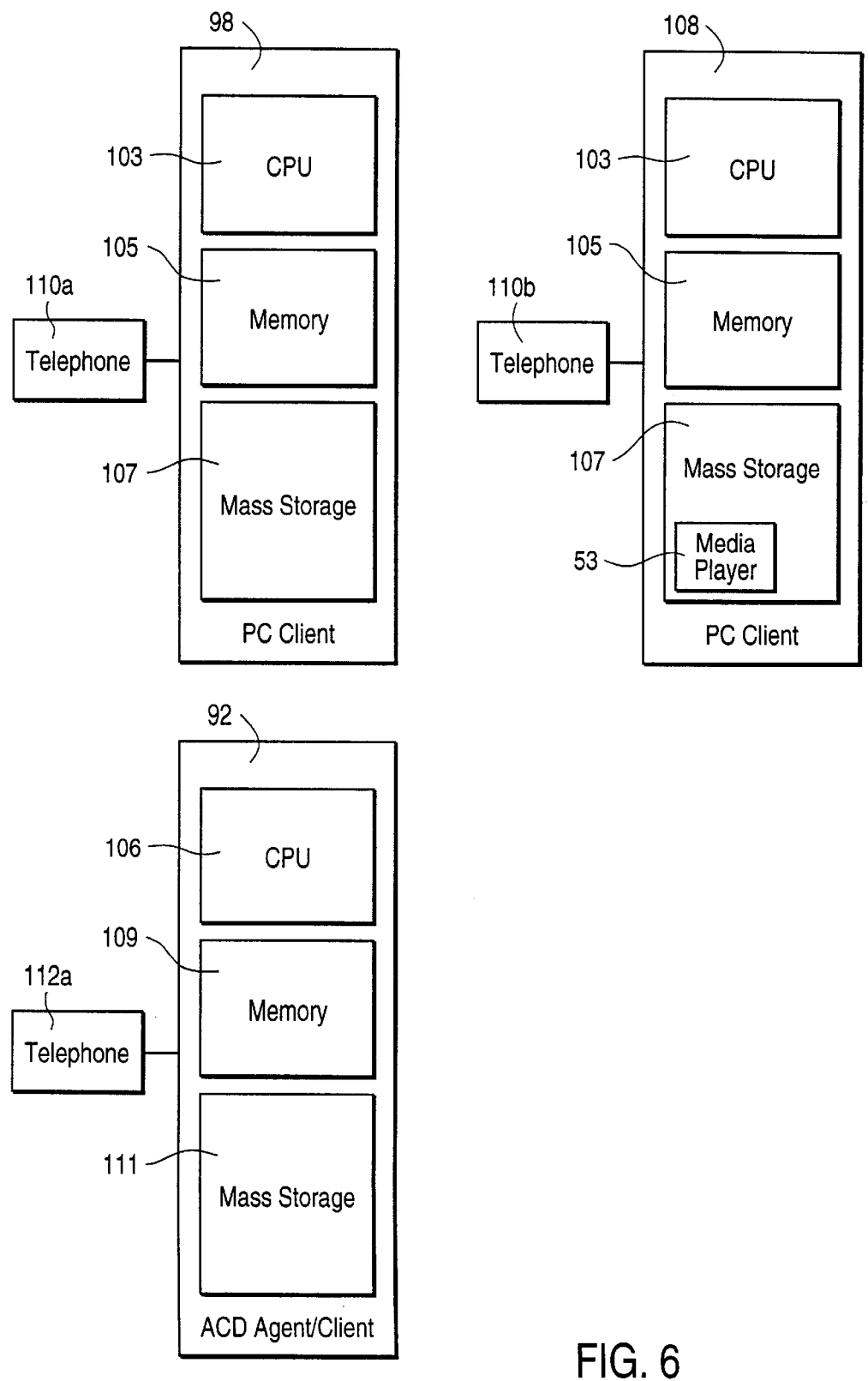
FIG. 6 is a detailed diagram of clients in the music-on-hold system.

Referring to FIG. 5, the music-on-hold system 50 is shown implemented, for example, in an ACD system server 96. The ACD server 96, which may be any known communication server, such as described in U.S. Pat. No. 5,247,670, and hereby incorporated by reference, includes internal standard components, such as a CPU 100, a memory 102, and a mass storage device 104 for storing the music-on-hold system 50, as described further below. As shown in FIG. 6, the telephones 112a, 112b are each connected to the ACD agent/PC client 92 and are used by call center agents to communicate with the callers on the telephones 110a, 110b that are connected to PC clients 98, 108 over the ToL system. The callers may, for example, be customers calling in to a company's customer service center, wherein the company uses a ToL system for telephone communications. Audio, in the form of voice conversation that is sent from the call center agents, is downloaded or transmitted from the server 96 to the client 98 in packet form and then sent on to the appropriate caller. The client 98 decodes the packet voice data and provides voice audio to the caller. Each of the clients 98, 108 also include a CPU 103, a memory device 105 and a mass storage device 107.

Figure 2:
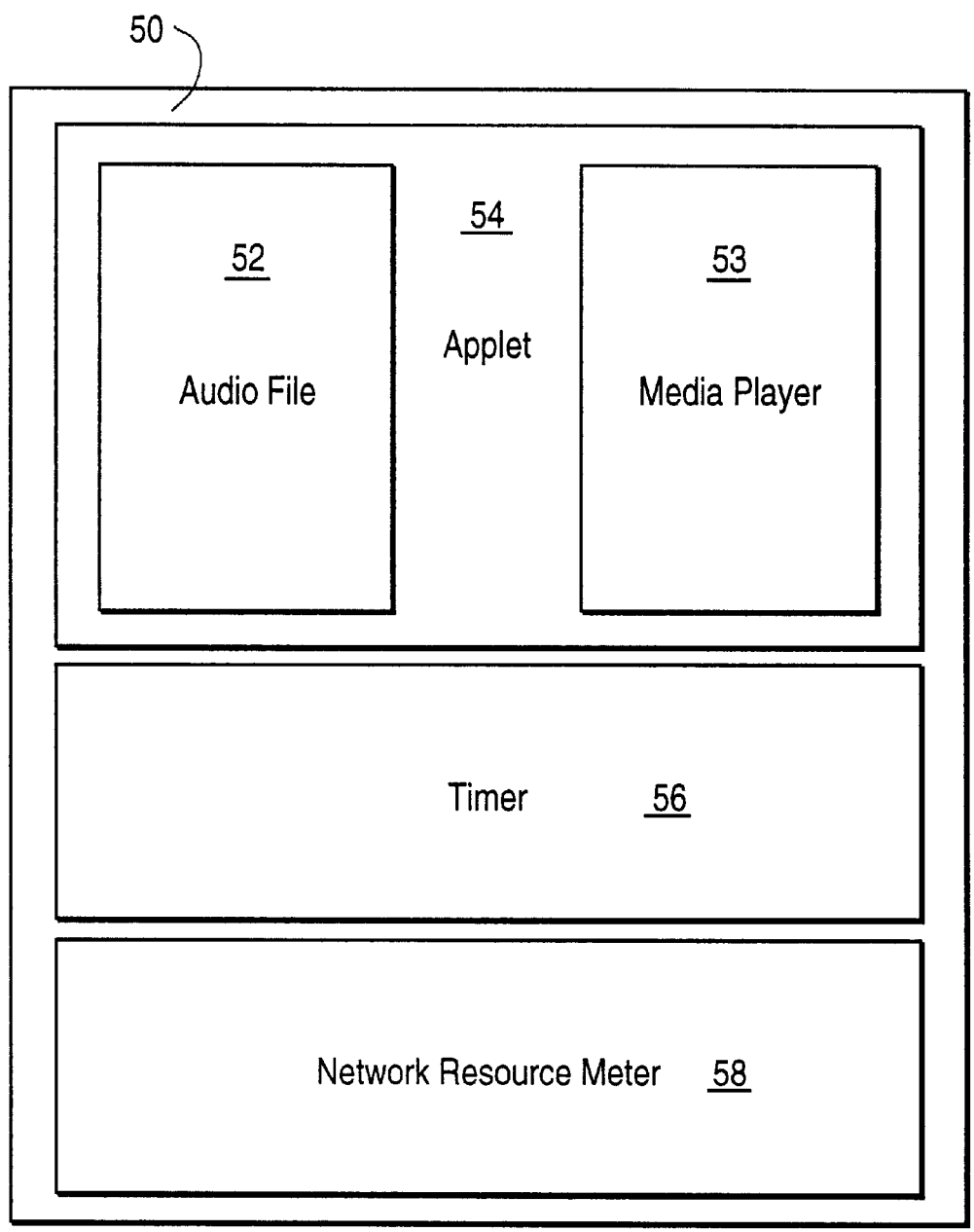
FIG. 2 is a detailed diagram of the music-on-hold system.

Referring to FIG. 2, the music-on-hold system 50 is shown in greater detail. As mentioned above, the music-on-hold system 50 is responsible for providing music or audio to callers that are on hold while waiting for a call center agent to become available. The music-on-hold system 50, in accordance with the present invention, includes a small application file, or applet 54, that may contain a predetermined audio file 52 having music or a voice message. The audio file may be in the form of a Windows Audio-Visual (WAV) file or any other standard audio file format, including a musical instruments device interface (MIDI) file. The applet 54 may also include a media player 53 to play the audio file 52. The media player 53 is also capable of playing video files. A timer 56 and a network resources meter 58 are provided to determine the average wait time for a caller on hold and the current throughput of the network in bits per second, respectively. This information may be used to set the mode of operation of the music-on-hold system 50.

For example, referring to FIGS. 1 and 2, each time a caller is placed on hold at the client 98, the timer 56 determines the length of time the caller was required to wait before being assisted by a call center agent. The wait time is stored in a register in the memory 102 on the server 96. As each subsequent call is serviced, the wait time value for each call is added to the stored time value and the average time is calculated by the CPU 100. In the register in the memory 102, the newly determined average time value replaces the previously determined stored time value. This process is dynamic and repeats each time a call is answered. This provides for relatively precise time measurements and the availability of the latest data in the register in the memory 102.

The network resource meter 58 constantly monitors the throughput of the network to determine the amount of available bandwidth. This value may be stored in a second register in the memory 102. Bandwidth availability constantly varies depending upon the network traffic conditions. Thus, the bandwidth determination process is also dynamic to ensure that the bandwidth usage numbers are relatively precise and available to the system at all times as well. The CPU 100 then determines the file size of the applet and stores that value in another register in the memory 102 for use in later calculations, as will be described below.

If all call center agents are busy and the caller is placed on hold, the CPU 100 determines whether music-on-hold is to be supplied to the client 98 solely in a real time protocol (RTP) stream or in parallel with the transmittal of the applet 54 from the server 96 to the client 98. In either case, the RTP stream is used to transmit music to the client 96 to provide music to the held caller.

The CPU 100 makes its determination by subtracting a predetermined bandwidth value of the RTP stream from the available bandwidth value stored in memory 102. For example, the total available bandwidth in the network, as stored in the memory register, may be thirty (30) kilobits per second (Kbps). The RTP stream bandwidth may be 8 Kbps. Thus, after subtracting the RTP stream bandwidth from the total available bandwidth, an available throughput of 22 Kbps is left. The available throughput is then used to determine the amount of time required to download the applet 54 from the server 96 to the client 98. For example, if the size of the applet 54 (which may include the audio file 52 and the media player 53) stored in a register in the memory 102, is say 512 kilobytes (KB) in size, then downloading the applet 54 from the server 96 to the client 98 may take approximately three minutes.

The CPU 100 compares the calculated download transfer time with the average wait time already stored in the memory register. If the wait time is less than the download time, then only the RTP stream is sent, since the call will most likely be answered by a call center agent before the applet 54 can finish downloading. On the other hand, if the average wait time, for example, is five minutes, and the applet 54 download transfer time is only three minutes, then the applet 54 may be sent from the server 96 to the client 98. Thus, bandwidth is preserved by eliminating the transmission of the RTP stream during the last two minutes of the caller's wait. The preserved bandwidth can thus be allocated to other uses, such as enabling another caller to access the ACD server 96. It should be noted that because many of the time values are dynamic, the above calculations are dynamic as well. Accordingly, the CPU 100 can choose to initiate or terminate the applet file transfer procedure at any time.

In instances where the gateway 122 is used for connecting to the PSTN 120 and the PBX 124, the applet 54 may be downloaded to the gateway 122, to ensure that the ACD server 96 resources and network bandwidth are not used in providing music. Similarly, if the router 114 is used to connect to other LANs 116 or to the internet 118, the applet 54 is sent from the ACD server 96 to the external LAN user or to the internet user for execution.

Figure 3:
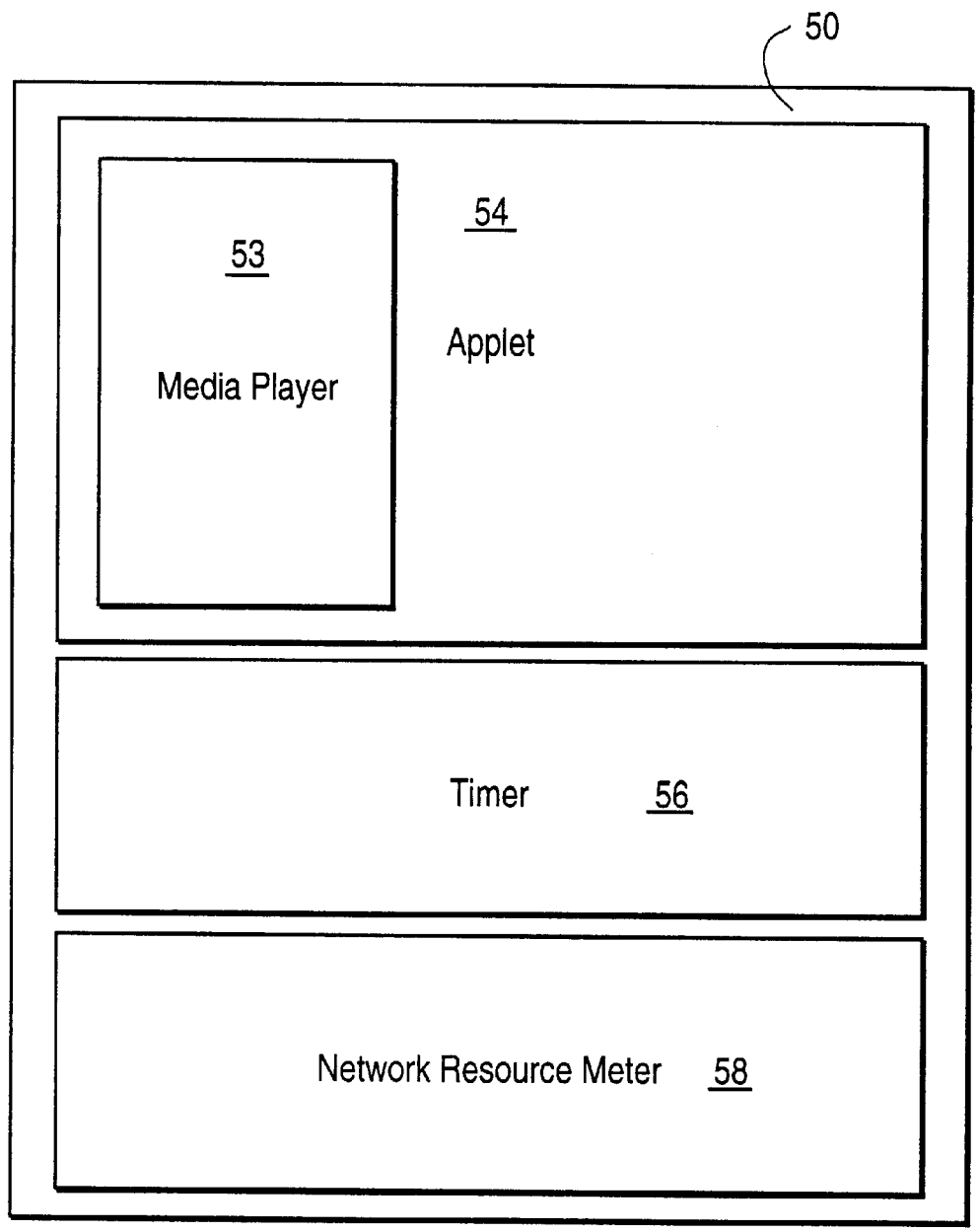
FIG. 3 is a detailed diagram of an alternate embodiment of the music-on-hold system.

Referring to FIG. 3, an alternate embodiment of the invention is shown. In particular, the music-on-hold system 50 is configured such that the applet 54 includes only the media player 53 and not a music file. As such, the applet 54 is much smaller in size and the transfer time for downloading the applet 54 from the server 96 to the client 98 is significantly reduced. Music, which is to be played by the media player 53, upon completion of the download, is obtained from the RTP stream. In particular, the music that is being sent in the RTP stream is copied from the RTP stream and stored on the client mass storage device 107 (FIG. 6) on the PC client 98. Therefore, once the media player 53 is finished downloading, the RTP stream may be stopped. This may accomplished intelligently by the ACD system. For example, if the call center is in the middle of a message, it can wait until the end of the speech to stop the stream. Alternatively, a message may be sent to the applet stating exactly where the music-on-hold file is stopping so that the applet can continue from where the RTP stream stopped. Music-on-hold or other audio is then provided at the client by the media player 53 playing the saved audio file.

In another alternate embodiment of the invention, as shown in FIG. 6, the media player 53 is built into the client 108 and stored on the mass storage device 107. Accordingly, the necessity for transferring the media player 53 from the server 96 to the client 108 is eliminated. To preserve even more bandwidth, the applet 54 may be configured to be only a very small file containing configuration information and control signals such that even a music file is not transferred, as described above. Thus, bandwidth normally required in transferring the media player 53 is preserved in addition to the bandwidth saved in not transferring the music file. The only bandwidth usage is by the RTP stream carrying music or audio messages from the server 96 to the client 108. The client 108, in order to obtain music for the music-on-hold system, saves the received RTP stream on the mass storage device 107. Once the particular song or message provided by the RTP stream is complete, the client 108 sends a message to the server 98 advising it to terminate the RTP stream. The client 98 is then able to replay the stored audio using the built in media player at the client instead of the server.

Figure 4:
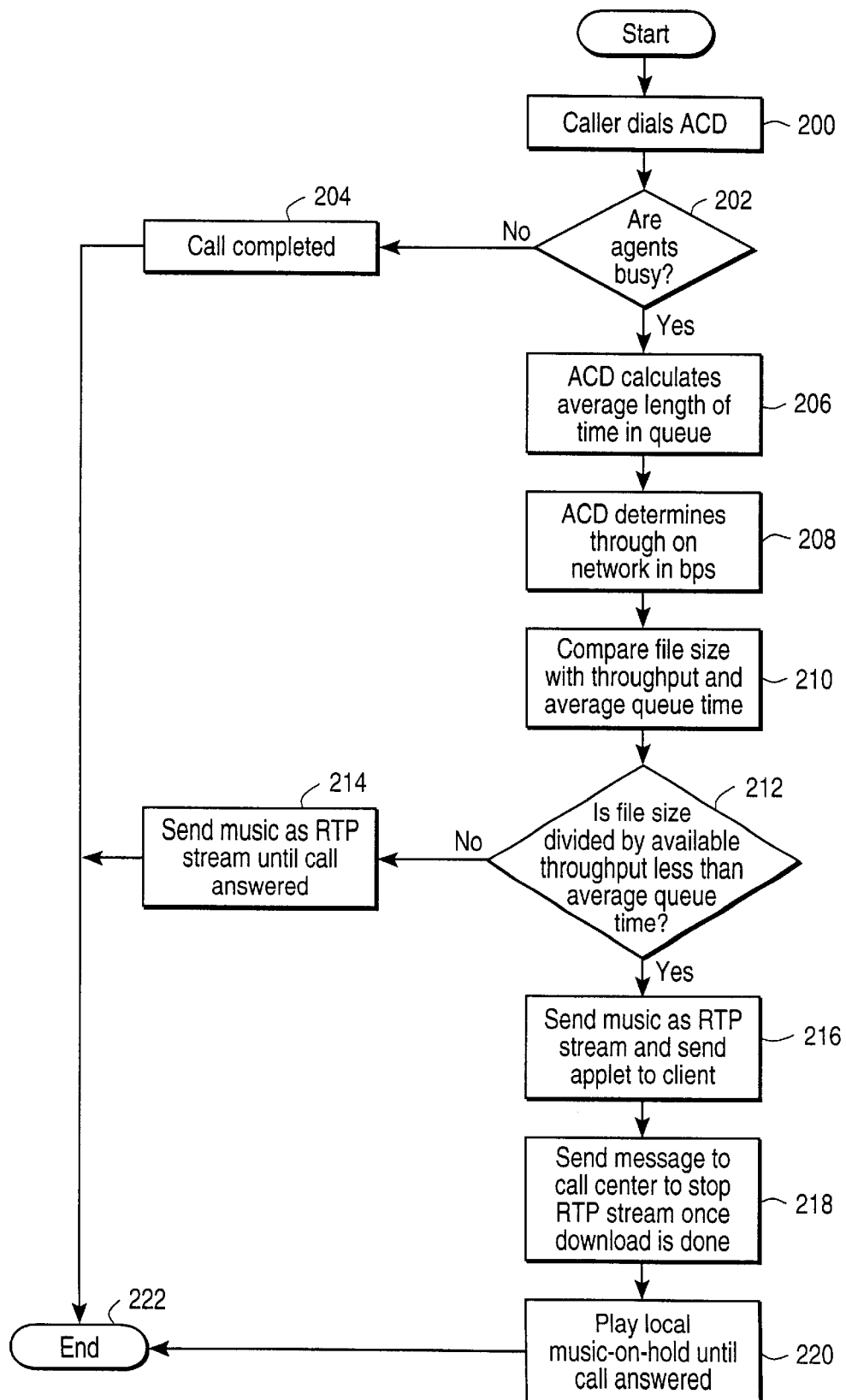
FIG. 4 is a flow diagram of the music-on-hold system in operation.

Referring to FIG. 4, a specific embodiment of the present invention is shown in operation. In particular, a caller dials the ACD system in step 200. In step 202, the system determines whether the call center agents are busy. If it is determined that the agents are not busy, the call is completed in step 204. However, if the agents are busy, the caller is placed on hold and the ACD calculates the average length of time the caller must spend in the queue in step 206. In step 208, the ACD determines throughput on the network in bits per second. In step 210, the system begins the process of comparing the file size with the throughput and average queue time of the call. In step 212, the ACD determines whether the file size divided by the available throughput is less than the average queue time. If not, then in step 214, only music-on-hold is sent in an RTP stream to the caller until the call is answered by a call agent. If, however, it is determined that the file size divided by the available throughput is indeed less than the average queue time, then in step 216 the applet is transferred from the server to the client The RTP stream continues to carry the music-on-hold during the transfer. In step 218, a message is sent to the call center server to stop the RTP stream once the download of the applet is completed. In step 220, music-on-hold is played at the client's site to the waiting callers until the call is answered by a call center agent or the caller hangs up. The system exits in step 222.

What is claimed is:

1. A communications system for providing music over a computer network to a user connected to a client workstation by way of a telephone who has been placed on hold, comprising:

a local area network;

a program stored on said local area network for playing audio;

means for transmitting a continuous audio stream to said client workstation when a caller is on hold; and means for transferring said program from said local area network to said client workstation while said continuous audio stream is being transmitted such that said client workstation terminates said continuous audio stream and said program plays locally at said client workstation; and means for switching between playing audio using said continuous audio stream and locally at said client workstation.

2. The call hold system of claim 1, wherein said program includes an audio file.

3. The call hold system of claim 1, wherein said program is transferred from said server to said client, for execution at said client workstation.

4. The call hold system of claim 2, wherein said program further includes a media player program for playing said audio file.

5. The system of claim 1 wherein said system is H.322 compliant.

6. A call hold system for providing audio to a caller placed on hold, comprising:

a server;

a client having a mass storage device in communication with said server;

a continuous stream of audio transmitted from said server to said client, said continuous audio stream adapted to provide real time audio to said caller when said caller is on hold, said audio being stored by said client on said mass storage device; and an applet stored on said server adapted to be downloaded to said client in parallel with said continuous stream to enable said client to terminate said continuous stream and to play said downloaded audio locally from said client using said applet, wherein said call hold system may switch from playing audio using said continuous stream to playing audio at said client and vice-versa.

7. The call hold system of claim 6, wherein said applet is already present on said client.

8. A communications system for providing video over a computer network to a user connected to a client workstation by way of a videophone who has been placed on hold, comprising:

a local area network;

a program stored on said local area network for playing video; and means for transmitting a continuous video stream to said client workstation when said caller is on hold;

means for transferring said program from said local area network to said client workstation while said continuous video stream is being transmitted such that said client workstation terminates said continuous video stream and said program plays locally at said client workstation and means for switching between playing video using said continuous video stream and locally at said client workstation.

9. The system of claim 8, wherein said program includes a media player program for playing said video.

10. The system of claim 8, wherein said program is transferred from said server to said client, for execution at said client workstation.

11. The system of claim 8 wherein said program includes a video file and a media player program for playing said video file.

12. The system of claim 8 wherein said video is already present on said client workstation.

13. The system of claim 8 wherein said system is H.323 compliant.

14. A call hold system for providing multimedia programming to a caller placed on hold, comprising:

a server;

a client having a mass storage device in communication with said server;

a continuous stream of multimedia transmitted from said server to said client, said continuous multimedia stream adapted to provide real time multimedia to said caller when said caller is on hold, said multimedia being stored by said client on said mass storage device; and a small application file stored on said server adapted to be downloaded to said client in parallel with said continuous stream to enable said client to terminate said continuous stream and to play said downloaded multimedia locally from said client using said small application file;

wherein said client is adapted to switch between playing said multimedia locally using said small application file and said continuous stream.

15. The call hold system of claim 14 wherein said application file comprises an applet.

16. The call hold system of claim 14 wherein said multimedia includes music.

17. The call hold system of claim 14 wherein said multimedia includes video.

18. The call hold system of claim 14 wherein said client is H.323 compliant.

19. A method for providing audio to a caller placed on hold in a system including a server and a client having a mass storage device in communication with said server, the method comprising:

transmitting a continuous stream of audio from said server to said client, said continuous audio stream adapted to provide real time audio to said caller when said caller is on hold;

storing said audio on said mass storage device;

downloading an applet stored on said server to said client in parallel with said continuous stream to enable said client to terminate said continuous stream and to play said downloaded audio locally from said client using said applet; and switching between playing said audio using said continuous stream and locally using said applet.

* * * * *